(12) United States Patent
Hartwell et al.

(10) Patent No.: US 11,984,631 B2
(45) Date of Patent: May 14, 2024

(54) ENCLOSED FUEL CELL STACK ROW

(71) Applicants: Daimler AG, Stuttgart (DE); Ford Motor Company, Dearborn, MI (US)

(72) Inventors: Rae Hartwell, Surrey (CA); Christopher Richards, Port Coquitlam (CA); Elisabeth Funk Woolliams, Vancouver (CA); Kathleen Megale, Vancouver (CA)

(73) Assignee: CELLCENTRIC GMBH & CO. KG, Kirchheim Unter Teck (DE)

( * ) Notice: Subject to any disclaimer, the term of this patent is extended or adjusted under 35 U.S.C. 154(b) by 681 days.

(21) Appl. No.: 17/051,104

(22) PCT Filed: May 7, 2019

(86) PCT No.: PCT/EP2019/061621
§ 371 (c)(1),
(2) Date: Oct. 27, 2020

(87) PCT Pub. No.: WO2019/219439
PCT Pub. Date: Nov. 21, 2019

(65) Prior Publication Data
US 2021/0234185 A1     Jul. 29, 2021

Related U.S. Application Data

(60) Provisional application No. 62/670,735, filed on May 12, 2018.

(51) Int. Cl.
*H01M 8/00*     (2016.01)
*H01M 8/021*     (2016.01)
(Continued)

(52) U.S. Cl.
CPC .......... *H01M 8/248* (2013.01); *H01M 8/021* (2013.01); *H01M 8/1018* (2013.01);
(Continued)

(58) Field of Classification Search
CPC .. H01M 8/247; H01M 8/0204; H01M 8/1018; H01M 8/248; H01M 8/021;
(Continued)

(56) References Cited

U.S. PATENT DOCUMENTS 5,804,326 A * 9/1998 Chow ................... H01M 8/241
                                                                                         429/437
2006/0093890 A1    5/2006   Steinbroner
(Continued)

FOREIGN PATENT DOCUMENTS

| DE | 10 2013 212 899 A1 | 8/2015 | |
|---|---|---|---|
| KR | 20030003560 | * 1/2003 | ............. H01M 8/24 |
| WO | WO 2017/131569 | 8/2017 | |

OTHER PUBLICATIONS

Cho et al. End Plate for Fuel Cell Stack, Jan. 2003, See the Abstract. (Year: 2003).*

(Continued)

*Primary Examiner* — Cynthia H Kelly
*Assistant Examiner* — Monique M Wills
(74) *Attorney, Agent, or Firm* — Farjami & Farjami LLP

(57) ABSTRACT

Solid polymer electrolyte fuel cell stacks require a significant nominal compressive loading for proper operation and sealing. This loading is typically provided using relatively thick end plates and tight straps. In certain fuel cell applications, one or more solid polymer electrolyte fuel cell stacks are secured in larger enclosures (e.g. for isolation and crashworthiness in automotive applications). The enclosures however can themselves be sturdy enough to provide the necessary loading on the fuel cell stacks within. The present invention takes advantage of that to allow for use of thinner end plates and/or weaker straps which would otherwise be insufficient for use.

5 Claims, 1 Drawing Sheet

(51) Int. Cl.
*H01M 8/1018* (2016.01)
*H01M 8/247* (2016.01)
*H01M 8/2475* (2016.01)
*H01M 8/248* (2016.01)

(52) U.S. Cl.
CPC ......... *H01M 8/247* (2013.01); *H01M 8/2475* (2013.01); *Y02E 60/50* (2013.01)

(58) Field of Classification Search
CPC ............. H01M 8/2475; H01M 8/0206; H01M 8/0221; Y02E 60/50
See application file for complete search history.

(56) References Cited

U.S. PATENT DOCUMENTS

| | | | |
|---|---|---|---|
| 2008/0305380 A1* | 12/2008 | Andreas-Schott | .... H01M 8/248 429/460 |
| 2010/0098978 A1 | 4/2010 | Hafemeister | |
| 2011/0081592 A1 | 4/2011 | Ma | |
| 2017/0207477 A1 | 7/2017 | Heinzmann | |

OTHER PUBLICATIONS

PCT International Search Report and Written Opinion dated May 12, 2018 for PCT/EP2019/061621 Filed May 7, 2019.

\* cited by examiner

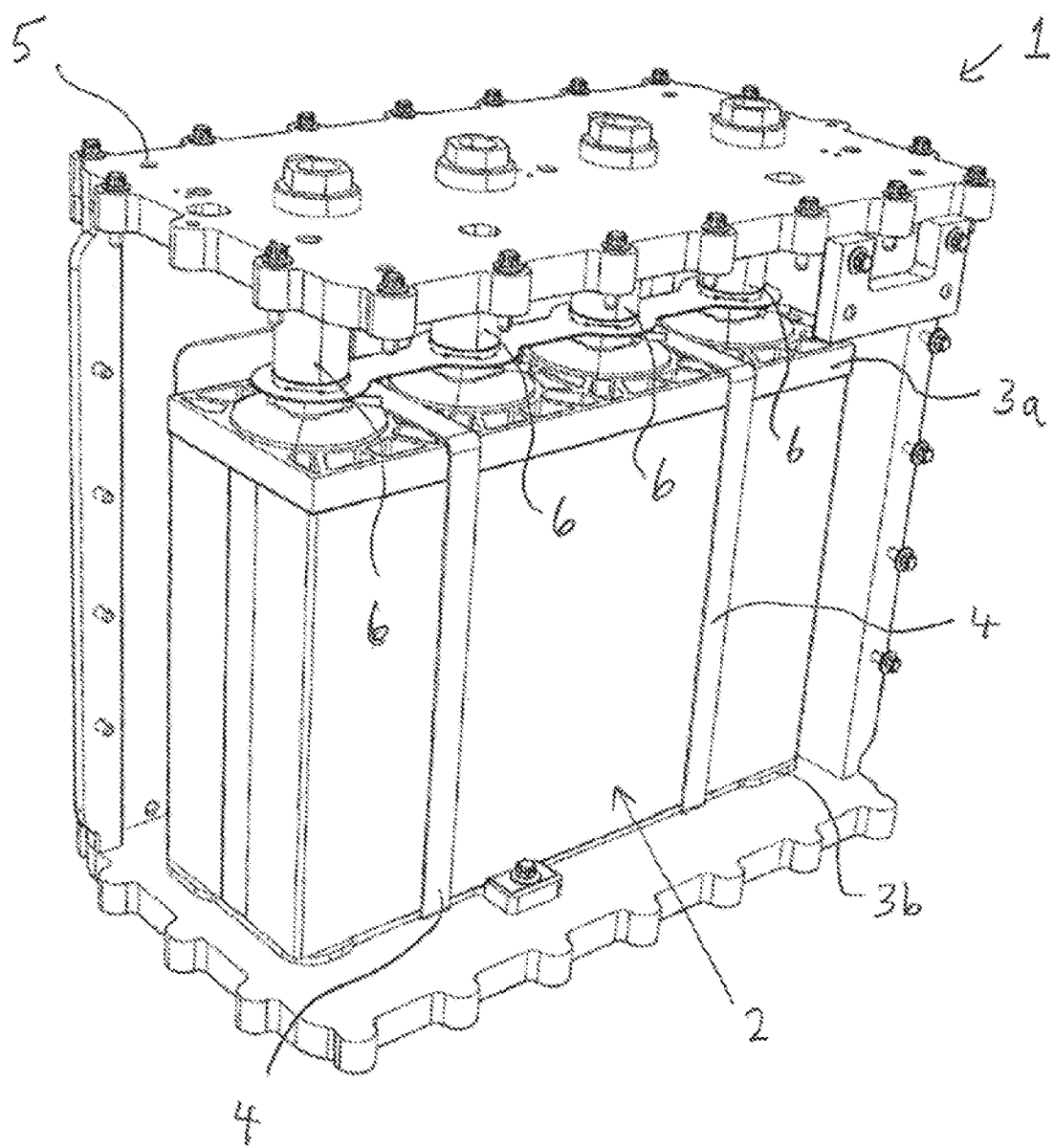

ENCLOSED FUEL CELL STACK ROW

This is a U.S. national phase application, which is based on, and claims priority from, PCT application Serial No. PCT/EP2019/061621, filed May 7, 2019, which is based on, and claims priority from U.S. Provisional Application Ser. No. 62/670,735, filed May 12, 2018, which are hereby incorporated by reference into the present application.

BACKGROUND

Field of the Invention

This invention relates to improved enclosed fuel cell stack rows in which a row of one or more solid polymer electrolyte fuel cell stacks is inserted in an enclosure.

Description of the Related Art

Fuel cells electrochemically convert fuel and oxidant reactants, (e.g. hydrogen and oxygen or air respectively), to generate electric power. One type of fuel cell is a solid polymer electrolyte fuel cell which generally employs a proton conducting polymer membrane electrolyte between cathode and anode electrodes. The electrodes contain appropriate catalysts and typically also comprise conductive particles, binder, and material to modify wettability. A structure comprising a proton conducting polymer membrane sandwiched between two electrodes is known as a membrane electrode assembly (MEA). Such assemblies can be prepared in an efficient manner by appropriately coating catalyst mixtures onto the polymer membrane, and thus are commonly known as catalyst coated membranes (CCMs). For purposes of handling, assembly, and electrical insulation, CCMs are often framed with suitable electrically insulating plastic frames.

Anode and cathode gas diffusion layers are usually employed adjacent their respective electrodes on either side of a catalyst coated membrane. The gas diffusion layers serve to uniformly distribute reactants to and remove by-products from the catalyst electrodes. Fuel and oxidant flow field plates are then typically provided adjacent their respective gas diffusion layers and the combination of all these components represents a typical individual fuel cell assembly. The flow field plates comprise flow fields that usually contain numerous fluid distribution channels. The flow field plates serve multiple functions including: distribution of reactants to the gas diffusion layers, removal of by-products therefrom, structural support and containment, and current collection. Often, the fuel and oxidant flow field plates are assembled into a unitary bipolar plate in order to incorporate a coolant flow field therebetween and/or for other assembly purposes.

Because the output voltage of a single cell is of order of 1V, a plurality of fuel cell assemblies is usually stacked together in series for commercial applications. Fuel cell stacks can be further connected in rows and/or arrays of interconnected stacks in series and/or parallel for use in automotive applications and the like.

Along with water, heat is a significant by-product from the electrochemical reactions taking place within the fuel cell. Means for cooling a fuel cell stack is thus generally required. Stacks designed to achieve high power density (e.g. automotive stacks) typically circulate liquid coolant throughout the stack in order to remove heat quickly and efficiently. To accomplish this, coolant flow fields comprising numerous coolant channels are also typically incorporated in the flow field plates of the cells in the stacks. The coolant flow fields are typically formed on the electrochemically inactive surfaces of both the anode side and cathode side flow field plates and, by appropriate design, a sealed coolant flow field is created when both anode and cathode side plates are mated together into a bipolar plate assembly.

Numerous seals are required in typical fuel cell stack construction, and achieving adequate, reliable seals in a manner suitable for commercial, high volume manufacture is challenging. Around the periphery of the MEAs, pressurized fuel and oxidant gases must be separated from each other (i.e. gas shorting around the edges of the membrane must be prevented) and also prevented from leaking to the external environment. Frames are commonly used to seal working fluids at the edges of MEAs.

Significant compressive force, or loading, needs to be applied to the stacked components in the fuel cell stacks in order to achieve intimate contact between the various components in the MEAs or CCMs, to obtain low contact resistances between relevant components, and to compress the various seals sufficiently to effect reliable seals. Further, due to the small features and tolerances involved in many of the components, providing and maintaining alignment of all the various components in the stack is also very important. Generally, both the required or nominal loading on the stack components and the required alignment of the stack components is achieved by using sophisticated alignment jigs to align the components during assembly and then securing the components in place, under the nominal loading required using a strapping arrangement which encircles the end plates. The force provided by the secured end plates then maintains the desired alignment of the components and maintain the nominal loading on the stack. The hardware employed for the straps and end plates in such stacks obviously must be sturdy enough to support this nominal loading without undergoing unacceptable elongation or deflection respectively.

As mentioned above, for certain applications (e.g. automotive) rows or arrays of fuel cell stacks are employed which comprise two or more stacks that are interconnected in various series and/or parallel configurations. Often these rows are enclosed in special enclosures for other purposes (e.g. in automotive applications, it can be to provide isolation, crashworthiness, waterproofing and dustproofing, as well as to provide convenient hardware for mounting purpose). These enclosures may themselves be sturdy to serve these other purposes and in addition the enclosures may provide additional compression to the stacks inside.

For example, US20110081592 discloses an exemplary array of fuel cell stacks that are situated inside an enclosure. The individual fuel cell stacks in the array are modular in design and comprise external straps. US20100098978 discloses an embodiment in which an enclosure provides additional compression to a fuel cell stack. WO2017131569 discloses an embodiment in which a fuel cell stack is accommodated into a housing with a compression force still applied by a stack press, wherein the fastening elements are pre-tightened before the compression force is released. US20060093890A1 discloses a fuel cell stack compressed by at least one compressive band looping the plates and the fuel cells in a closed loop. DE102013212899 discloses a fuel cell stack compressed by at least one continuous strap. US20170207477 discloses a system and method for assembling and compression of a fuel cell stack. The elements of the fuel cell stack are stacked and aligned in a housing with datum pins for the alignment. The stack is then compressed by the housing.

While numerous designs for fuel cell stacks and enclosed rows or arrays of stacks are known in the art, there remains a continuing need for improvements with regards to reductions in cost, size, and weight. This invention fulfills these needs and provides further related advantages.

SUMMARY

The present invention provides for improvements in enclosed fuel cell stack rows comprising solid polymer electrolyte fuel cell stacks. The present invention takes advantage of situations where the enclosure used is sturdy enough and can be arranged so as to significantly support much of the nominal loading required on the fuel cell stacks within. In such situations, the mechanical requirements for either or both of the end plate hardware and the compression strap hardware can be relaxed. Thus for instance, thinner and/or weaker end plates and/or compression straps may be employed which allow for weight and size reduction of these components in the stack. Further, alternative weaker material choices might be considered (e.g. plastics). Such advantages may be obtained without sacrificing alignment or final net loading on the stacks.

Specifically, an enclosed fuel cell stack row of the invention comprises at least one solid polymer electrolyte fuel cell stack and an enclosure. Each fuel cell stack comprises a series stack of a plurality of solid polymer electrolyte fuel cells, a pair of end plates at either end of the series stack, and at least one stack strap encircling the series stack and the end plates. Further, each pair of end plates applies compressive force to each respective series stack at a nominal loading for fuel cell stack operation. And the enclosure is capable of supporting the nominal loading for each fuel cell stack in the fuel cell stack row. The fuel cell stack row of the invention is characterized in that the combination of end plates and the at least one stack strap in each fuel cell stack is insufficient per se to provide the nominal loading for each fuel cell stack.

In an exemplary embodiment of the invention, the nominal loading on the stacks for normal operation can be greater than or about 27 kN. Further, the end plates of the fuel cell stacks may be insufficient per se to support the nominal loading. For instance, this can be the case in an embodiment in which the deflection of the end plates per se under the nominal loading would exceed 1.5 mm. This is a significant deflection and is considered unacceptable in some embodiments. In the invention however, the enclosure supports each pair of such end plates so as to provide the nominal loading on each series stack. Thus, thinner end plates (e.g. less than about 4 cm in thickness) made of thermoplastic material may be employed in embodiments of the invention. Alternatively, thinner end plates (e.g. less than about 0.8 cm in thickness) made of steel may be employed and thinner end plates (e.g. less than about 2.5 cm in thickness) made of aluminum may be employed.

In another embodiment, the stack strap or straps may be insufficient per se to support the nominal loading. For instance, this can be the case in an embodiment in which the elongation of the strap or straps per se under the nominal loading would exceed 0.5 mm. Again in the invention however, the enclosure supports each pair of end plates so as to maintain the nominal loading on each series stack. Thus, stack straps with smaller cross-sectional area (e.g. less than about 20 cm$^2$) made of plastic material may be employed in embodiments of the invention. Alternatively, stack straps with smaller cross-sectional area (e.g. less than about 1 cm$^2$) made of steel or aluminum may be employed.

Generally, the method of assembling an enclosed fuel cell stack row of the invention involves:
aligning the plurality of fuel cells and the pair of end plates for each fuel cell stack in a jig for alignment and compression,
compressing the aligned series stack and pair of end plates in the jig to a fixed loading less than the nominal loading,
encircling the compressed and aligned series stack and pair of end plates with the at least one stack strap,
securing the stack strap, thereby forming each fuel cell stack,
inserting each fuel cell stack in the enclosure, and
compressing each fuel cell stack to the nominal loading.

The fixed loading employed is sufficient to readily maintain alignment of the stack components during subsequent handling until assembly of the stack is completed (and particularly until nominal loading is applied and straps are secured around the stack). However, the fixed loading is preferably substantially less than the nominal loading required in order to allow for the greatest possible reduction in weight and/or size of the end plate and strap hardware. For instance then, the fixed loading can be less than or about 15 kN.

An appropriate stack strap or straps for use in the invention can be of fixed length. In such a case, the encircling step can comprise sliding the stack strap over the compressed and aligned series stack and pair of end plates. Alternatively, the stack straps can be made of plastic material and initially can have excess length. In such a case, the securing step can comprise heat sealing the ends of the stack strap together.

In embodiments of the invention, the required loading to be provided by the enclosure can be achieved by employing an enclosure comprising jacking screws between one of the end plates and each fuel cell stack. In such an embodiment, the step of compressing each fuel cell stack can comprise appropriately tightening the jacking screws.

After the stacks are properly installed in the enclosure and are compressed to the nominal loading, the straps may no longer be needed for normal operation of the fuel cell stack row. Advantageously however, the straps may simply be left loosely in place so that the stacks remain restrained and so that alignment is maintained in the event that the enclosure is removed for some reason thereafter (e.g. for replacement of a stack, for analysis, or for removal and later re-insertion of a stack for maintenance/technical service purposes).

These and other aspects of the invention are evident upon reference to the attached Figures and following detailed description.

BRIEF DESCRIPTION OF THE DRAWINGS

FIG. 1 shows a cutaway view of an enclosed fuel cell stack row of the invention.

DETAILED DESCRIPTION

Herein, the following definitions have been used. In a quantitative context, the term "about" should be construed as being in the range up to plus 10% and down to minus 10%.

The term "insufficient per se" is used herein with reference to certain mechanical properties of specific fuel cell components and is intended to refer to the relevant mechanical properties of that specific fuel cell component—on its own—without additional support, additional supporting components, or other mechanical assistance provided to that specific fuel cell component. In a like manner, terms such as deflection of the end plates "per se" or elongation of a strap "per se" are intended to refer to that mechanical property of that specific component—on its own—without additional support, additional supporting components, or other mechanical assistance provided.

The term "nominal loading" refers to the minimal compression force which is required to ensure that the fuel cell stack works properly with respect to gas tightness and electrical contact.

A cutaway view of an assembled enclosed fuel cell stack row of the invention is shown in FIG. 1. Here, the enclosed fuel cell stack row has been designed to be suitable for automotive application. In the cutaway view of enclosed fuel cell stack row 1 of FIG. 1, only a single fuel cell stack 2 is shown to reduce clutter. However, a typical such stack row would comprise several fuel cell stacks similar to that shown. Fuel cell stack 2 comprises a series stack of a plurality of solid polymer electrolyte fuel cells (not called out in FIG. 1), a pair of end plates 3a, 3b at either end of stack 2, and two stack straps 4 that encircle stack 2 and end plates 3a, 3b for securing the numerous components in place. Fuel cell stack 2 and other stacks in the stack row are all enclosed in enclosure 5. For automotive purposes, enclosing the fuel cell stacks in enclosure 5 serves to provide isolation and crashworthiness. Further, it provides waterproofing, dustproofing, and means for mounting into a vehicle.

In prior art embodiments, the end plates and stack straps employed in the assembly of a fuel cell stack not only secure the stack adequately for handling purposes but also have to provide sufficient loading or compressive force to the stack to effect and maintain adequate seals and sufficient loading to the components in the stack for other functional purposes (e.g. to obtain low contact resistances between components). Thus, the mechanical properties of the endplates must be such that they do not deflect an unacceptable amount under the desired nominal loading for an operating fuel cell stack. Further, the mechanical properties of the stack straps must be such that they do not stretch or elongate an unacceptable amount under the desired nominal loading for an operating fuel cell stack.

The present invention however takes advantage of situations where enclosure 5 is already or can be made sturdy enough to significantly support much of the nominal loading required on the fuel cell stacks within. In such situations, the mechanical requirements for either or both of the end plate hardware and the compression stack strap hardware can be relaxed. Thus for instance, thinner and/or weaker end plates and/or compression straps may be employed which allow for weight and size reduction of these components in the stack. Further, alternative weaker material choices might be considered (e.g. plastics). Such advantages may be obtained without sacrificing alignment or final net loading on the stacks. Thus inventive fuel cell stack row 1 in FIG. 1 differs from a prior art fuel cell stack row in that either end plates 3a, 3b are thinner and/or stack straps 4 are smaller in cross-sectional area than their counterparts in the prior art. Further however, a suitable hardware arrangement or configuration must be incorporated in the design of fuel cell stack row 1 such that enclosure 5 supports the nominal loading on each fuel cell stack 2 inside. In FIG. 1, a series of jacking screws 6 provide this support between enclosure 5 and fuel cell stack 2.

Enclosed fuel cell stack row 1 can be assembled in very much the same way as fuel cell stack rows of the prior art are assembled, except that the nominal loading on fuel cell stack 2 and other stacks within is provided after assembly of the individual fuel cell stacks as opposed to during assembly of the individual fuel cell stacks. For instance, enclosed fuel cell stack row 1 may be made by first assembling individual fuel cell stacks using thinner end plates 3a, 3b and/or lower cross-sectional area stack straps 4. As in the prior art, this is done by aligning the fuel cells for each fuel cell stack and the pair of end plates for each fuel cell stack in a jig for alignment and compression. Each aligned series stack and pair of end plates is compressed in the jig, but to a fixed loading less than the nominal loading. An appropriate number of stack straps are then installed so as to encircle the compressed and aligned series stack and pair of end plates, and then the stack straps are secured in place, thereby forming each fuel cell stack. During assembly, the fixed loading employed is sufficient to readily maintain alignment of the stack components during subsequent handling until assembly of the stack is completed (and particularly until nominal loading is applied and straps are secured around the stack). However, the fixed loading is preferably substantially less than the nominal loading required in order to allow for the greatest possible reduction in weight and/or size of the end plate and strap hardware.

Note that an appropriate stack strap or straps for use in the invention can be of fixed length. In such a case, the encircling step can comprise sliding the stack strap over the compressed and aligned series stack and pair of end plates. Alternatively, the stack straps can be made of plastic and initially can have excess length. In such a case, the securing step can comprise heat sealing the ends of the stack strap together.

After assembling the individual fuel cell stacks, each stack is inserted in the enclosure and compressed to the nominal loading. As shown in FIG. 1, the required nominal loading may be obtained by appropriate use of jacking screws 6. In such an embodiment, the step of compressing each fuel cell stack can comprise appropriately tightening jacking screws 6.

After the fuel cell stacks 2 are properly installed in enclosure 5 and are compressed to the nominal loading, straps 4 may no longer be needed for normal operation of fuel cell stack row 1. Advantageously however, straps 4 may simply be left loosely in place so that stacks 2 remain restrained and so that alignment is maintained in the event that enclosure 5 is removed for some reason thereafter (e.g. for replacement of a stack, for analysis, or for maintenance purposes). Alternatively, the straps could be cut and removed if desired.

The preceding figure shows an exemplary embodiment of the invention but those skilled in the art will appreciate that numerous alternative embodiments may be contemplated (e.g. embodiments comprising more than two stack straps 4 per fuel cell stack 2, or comprising different means than jacking screws 6 for providing support for the nominal loading on fuel cell stacks 2).

The following Example has been included to illustrate certain aspects of the invention but should not be construed as limiting in any way.

EXAMPLES

In an exemplary embodiment for automotive applications, the nominal loading for normal functioning and operation of a typical solid polymer electrolyte fuel cell stack is about 27 kN. A commonly accepted deflection limit for the end plates under such loading is about 1.5 mm. And a commonly accepted elongation limit for the securing stack straps is about 0.5 mm.

Given the preceding, it is possible to calculate the minimum thickness requirements for various materials that might be considered for use in end plates so that the preceding acceptable deflection limit can be achieved. For end plates made of thermoplastic, steel, and aluminum respectively, the minimum thicknesses required are calculated to be about 4, 0.8, and 2.5 cm respectively. End plates made of these materials with thicknesses less than these values would not be expected to be sufficient per se to support the nominal loading.

In a like manner, it is also possible to calculate the minimum cross-sectional area requirements for various materials that might be considered for use in stack straps so that the preceding acceptable elongation limit can be achieved. For stack straps made of plastic, steel, and aluminum respectively, the minimum cross-sectional areas required are calculated to be about 20, 1, and 1 $cm^2$ respectively. Stack straps made of these materials with cross-sectional areas less than these values would not be expected to be sufficient per se to support the nominal loading.

In this exemplary embodiment, it has been found that a 15 kN loading is sufficient to maintain alignment of the numerous components for subsequent handling during assembly of the fuel cell stacks. In fact, even lower fixed loadings may prove to be sufficient. But at least a 15 kN fixed loading—which is substantially less than the 27 kN nominal loading—is sufficient loading until assembly of the individual stacks is completed. Thus, thinner end plates and/or stack straps with smaller cross-sectional areas that are commensurate with this lower fixed loading requirement may be employed in this exemplary embodiment of the invention.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

What is claimed is:

1. An enclosed fuel cell stack row comprising:
   at least one solid polymer electrolyte fuel cell stack; and
   an enclosure;
   wherein each of the at least one solid polymer electrolyte fuel cell stack comprises:
      a series stack of a plurality of solid polymer electrolyte fuel cells;
      a pair of end plates at either end of the series stack; and
      at least one stack strap encircling the series stack and the end plates;
   wherein each of the end plates applies compressive force to each respective end of the series stack at a nominal loading for operating the at least one solid polymer electrolyte fuel cell stack, and wherein the enclosure is capable of supporting the nominal loading for each of the at least one solid polymer electrolyte fuel cell stack in the fuel cell stack row;
   wherein each aligned one of the at least one solid polymer electrolyte fuel cell stack is compressed to a fixed loading less than the nominal loading by a combination of the end plates and the at least one stack strap in each of the at least one solid polymer electrolyte fuel cell stack, wherein the combination is insufficient on its own to provide the nominal loading for each of the at least one solid polymer electrolyte fuel cell stack.

2. The enclosed fuel cell stack row of claim 1, wherein a deflection of the end plates on their own under the nominal loading on the series stack exceeds 1.5 mm, and wherein the enclosure supports the end plates so as to provide the nominal loading on the series stack.

3. The enclosed fuel cell stack row of claim 1, wherein an elongation of the at least one strap on its own under the nominal loading on the series stack exceeds 0.5 mm, and wherein the enclosure supports the end plates so as to maintain the nominal loading on the series stack.

4. The enclosed fuel cell stack row of claim 2, wherein one of the end plates is made of thermoplastic material and has a thickness less than about 4 cm.

5. The enclosed fuel cell stack row of claim 1, wherein the nominal loading for operating the at least one solid polymer electrolyte fuel cell stack is greater than or about 27 kN.

* * * * *